(12) United States Patent
Yoshimura et al.

(10) Patent No.: US 8,102,544 B2
(45) Date of Patent: Jan. 24, 2012

(54) IMAGE PROCESSING APPARATUS, IMAGE PROCESSING METHOD, AND COMPUTER-READABLE STORAGE MEDIUM FOR COMPUTER PROGRAM

(75) Inventors: Tomonari Yoshimura, Kyoto (JP); Atsushi Ohshima, Amagasaki (JP); Masami Yamada, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 409 days.

(21) Appl. No.: 12/485,327

(22) Filed: Jun. 16, 2009

(65) Prior Publication Data

US 2009/0316199 A1 Dec. 24, 2009

(30) Foreign Application Priority Data

Jun. 20, 2008 (JP) ................. 2008-161245

(51) Int. Cl.
*G06K 15/02* (2006.01)
*G06K 9/20* (2006.01)
*G06K 7/10* (2006.01)
*G06F 3/12* (2006.01)
*H04N 1/40* (2006.01)
*H04N 5/445* (2011.01)

(52) U.S. Cl. ............ 358/1.11; 358/1.15; 358/3.28; 358/426.04; 382/312; 713/155; 725/51; 235/470

(58) Field of Classification Search ............... 358/1.11, 358/426.04, 1.15, 1.16, 1.14, 3.28; 382/312; 713/155, 156; 725/51, 109, 112, 113; 235/470, 235/494
See application file for complete search history.

(56) References Cited

U.S. PATENT DOCUMENTS

| 2005/0277405 | A1* | 12/2005 | Noguchi | 455/411 |
| 2007/0019222 | A1* | 1/2007 | Oda et al. | 358/1.13 |
| 2007/0214124 | A1 | 9/2007 | Tateno | |
| 2008/0172220 | A1 | 7/2008 | Ohshima | |

FOREIGN PATENT DOCUMENTS

| JP | 2002-189925 A | 7/2002 |
| JP | 2003-296594 A | 10/2003 |
| JP | 2004-274456 | 9/2004 |
| JP | 2007-188356 | 7/2007 |
| JP | 2007-241888 | 9/2007 |

* cited by examiner

*Primary Examiner* — Thomas Lett
(74) *Attorney, Agent, or Firm* — Buchanan Ingersoll & Rooney PC (57) ABSTRACT

A terminal is provided with an image obtaining portion that obtains an image including a code representing a location of a web page, a web page obtaining portion that obtains the web page based on the code included in the image, a calculation portion that compares the image except the code with the web page to calculate a degree of relevance between the image except the code and the web page, and a print controller that issues a command to print the image with the code excluded if the degree of relevance is lower than a predetermined threshold, and to print the image without excluding the code if the degree of relevance is equal to or greater than the predetermined threshold.

16 Claims, 12 Drawing Sheets

TLF

| PAGE NAME | URL |
|---|---|
| ABC SHOP | http://www.*****.com |
| DEF CORPORATION | http://www.******.com |
| ⋮ | ⋮ |

NEW MODEL XYZ-2
NOW ON SALE!

THE LONG-AWAITED
SUCCESSOR TO XYZ-1
HAS JUST BEEN
LAUNCHED ON THE
MARKET.
⋮

ABC AUTOMOBILE SALES
CO., LTD.

IMAGE PROCESSING APPARATUS, IMAGE PROCESSING METHOD, AND COMPUTER-READABLE STORAGE MEDIUM FOR COMPUTER PROGRAM

This application is based on Japanese Patent Application No. 2008-161245 filed on Jun. 20, 2008, the contents of which are hereby incorporated by reference.

BACKGROUND OF THE INVENTION

1. Field of the Invention

The present invention relates to an apparatus and method for processing image data to which code data, such as a QR code, representing the location of a web page is added, a computer program, and the like.

2. Description of the Related Art

At present, the Internet is widely used, and many companies, shops, and the like conduct advertising activities by utilizing the Internet. Specifically, the companies, the shops, or the like create a web page containing, for example, their introductions and descriptions of products offered by them. Then, they conduct advertising activities by publishing the web page on a web server.

The following technology is disclosed as a technology for supporting such advertising activities by utilizing the Internet (see JP 2002-189925A).

According to the technology disclosed in JP 2002-189925A, an advertisement managing server manages a URL and a last update date of an advertisement header acceptance web page that an advertisement insertion acceptor opens on the Internet. When an advertisement header embedded in the advertisement header acceptance web page is clicked on, the advertisement managing server is notified of the event and records a history of the event. Further, the update date of the web page is recognized and compared with a last update date registered in a database to check whether or not the web page has been updated since the web page was registered in the database. When the web page has been updated, the new web page is obtained from the Internet and the contents of the new web page are analyzed by using a predetermined algorithm. If the contents violating the contract with the advertisement insertion acceptor are detected, the event is reported to a person in charge in an advertisement agency.

Incidentally, electronic file brochures, in addition to conventional paper brochures, have recently been used as brochures for advertisement offered by companies or the like. In particular, electronic file brochures in Portable Document Format (PDF) are commonly used. Such electronic file brochures are generally called, for example, "electronic brochures".

Further, in many cases, brochures have recently contained a code image, e.g., a Quick Response (QR) code, representing a URL of a web page of a company, a shop, or the like that offers the brochures. A viewer of the brochure uses a digital camera to capture such a code image and input the captured code image to a personal computer, thereby allowing the viewer to access a web page easily. The viewer can also use a portable phone terminal having a digital camera function to capture such a code image and access a web page in a similar manner.

However, in some cases, brochures intentionally contain a code image representing a URL of a web page irrelevant to the contents advertised in the brochures. Such brochures may be counterfeited by copying the advertisement contents as-is and replacing the real code image with a fake code image, i.e., a fake code image through which a viewer is led to an irrelevant web page. Alternatively, such brochures may contain exaggerated advertisement contents attempting to make a viewer think something is good or important, and a code image through which a viewer is led to a web page irrelevant to the advertisement contents.

When such counterfeit or exaggerated brochures are distributed, a recipient thereof attempts to use a code image contained therein to access a web page of an advertiser. However, the recipient is forced to access a different and undesired web page. As a result, for example, a web page containing unfavorable contents for children from an educational perspective may be displayed, or a web page in which the recipient is not interested may be displayed, which, in turn, makes the recipient uncomfortable.

SUMMARY

The present disclosure is directed to solve the problems pointed out above, and therefore, an object of an embodiment of the present invention is to prevent a viewer of a brochure from being forced to access a web site irrelevant to the brochure through a code image contained therein, as compared to the conventional apparatus or method.

According to one aspect of the present invention, an image processing apparatus includes an image obtaining portion that obtains an image including a code, the code representing a location of a web page, a web page obtaining portion that obtains the web page based on the code included in the image, a calculation portion that compares the image except the code with the web page to calculate a degree of relevance between the image except the code and the web page, and a print controller that issues a command to print the image with the code excluded if the degree of relevance is lower than a predetermined threshold, and to print the image without excluding the code if the degree of relevance is equal to or greater than the predetermined threshold.

DESCRIPTION OF THE PREFERRED EMBODIMENTS

Figure 1:
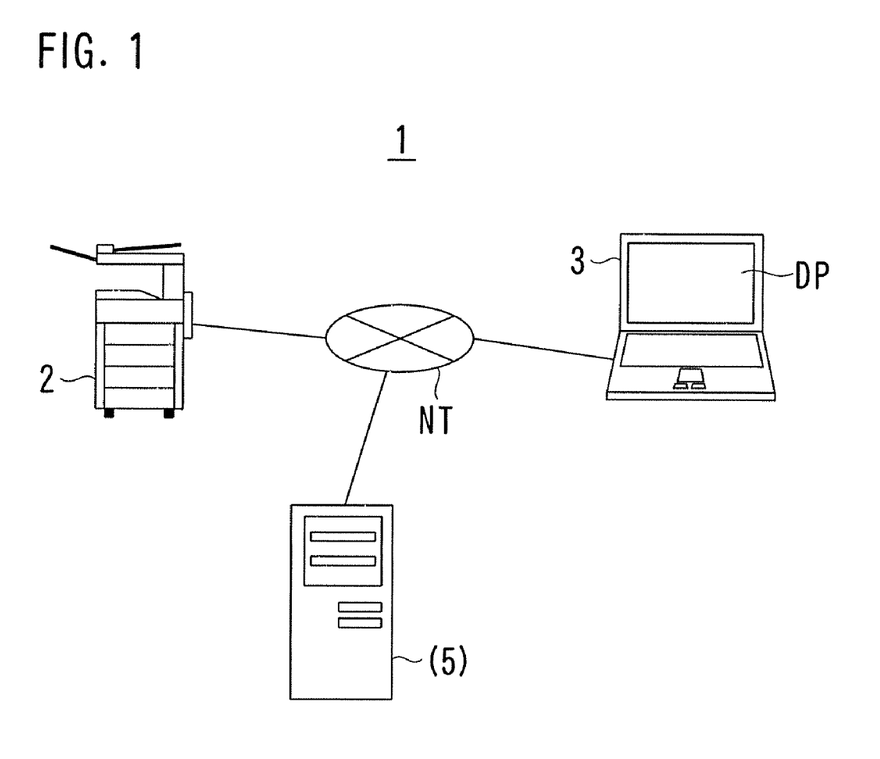
FIG. 1 is a diagram illustrating an example of the overall configuration of an information processing system.
Figure 2:
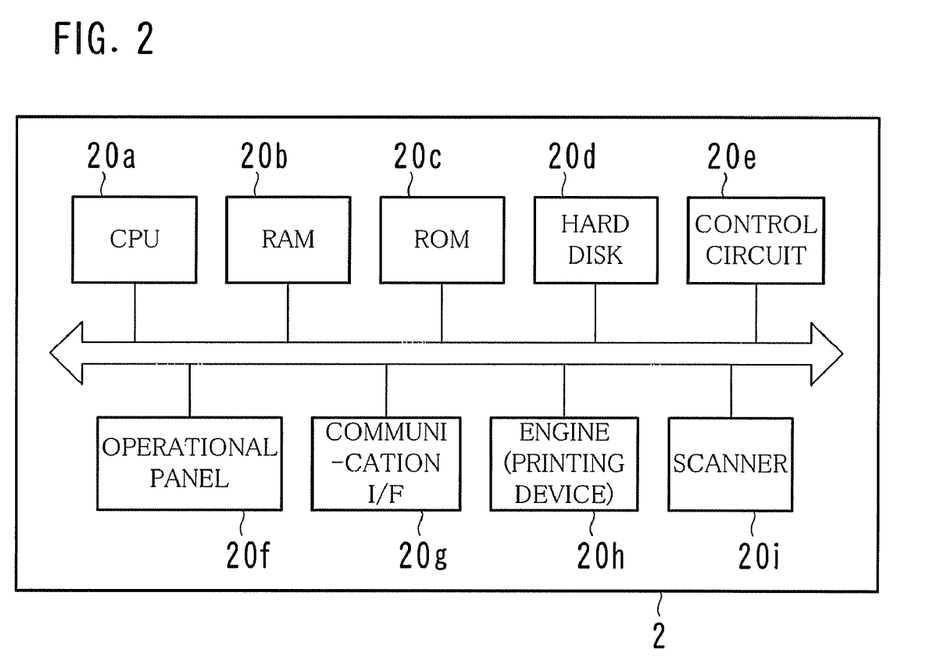
FIG. 2 is a diagram illustrating an example of the hardware configuration of an image forming apparatus.
Figure 3:
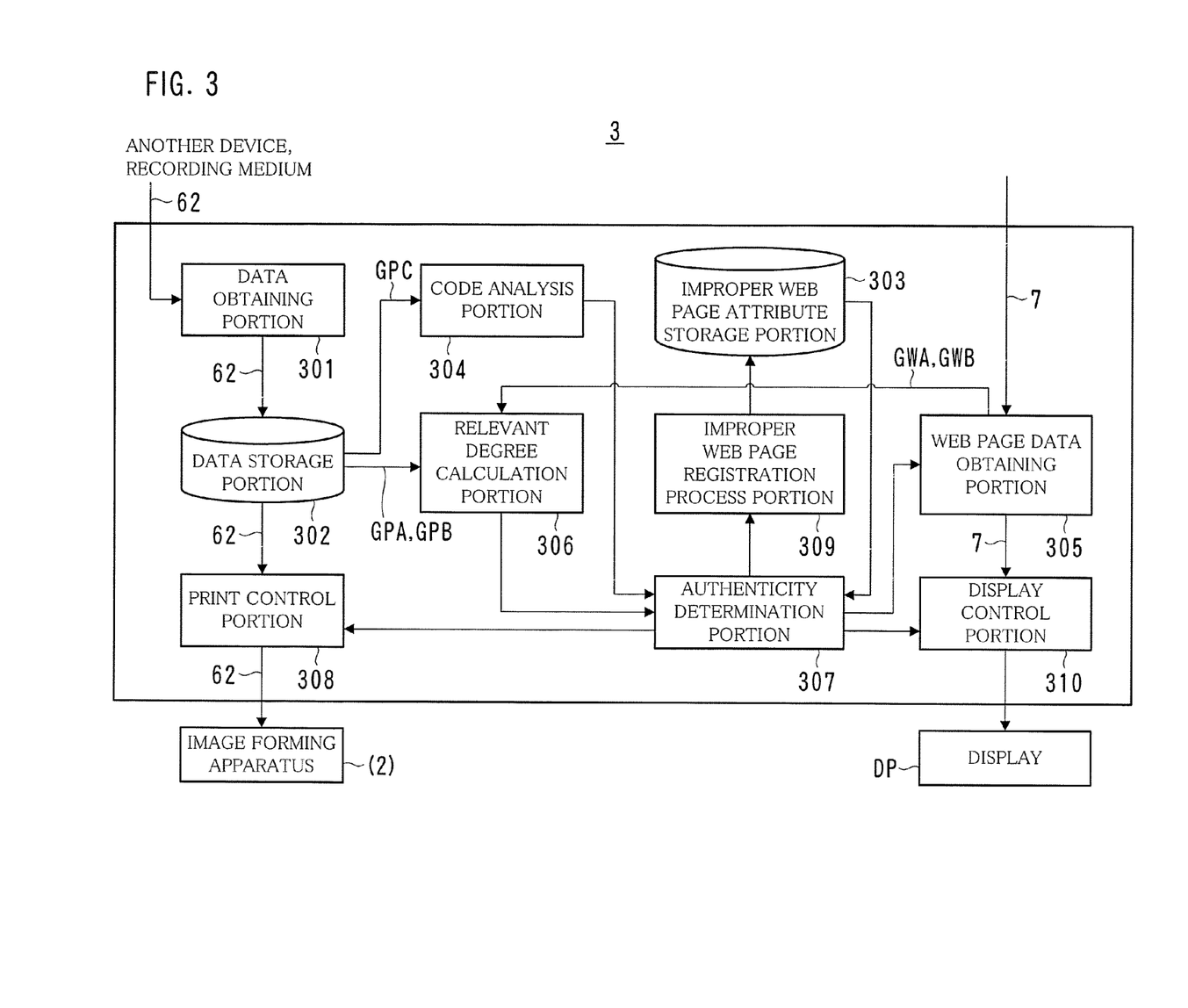
FIG. 3 is a diagram illustrating an example of the functional configuration of a terminal.

FIG. 1 is a diagram illustrating an example of the overall configuration of an information processing system 1; FIG. 2 is a diagram illustrating an example of the hardware configuration of an image forming apparatus 2; and FIG. 3 is a diagram illustrating an example of the functional configuration of a terminal 3.

Referring to FIG. 1, the information processing system 1 according to an embodiment of the present invention is configured of the image forming apparatus 2, the terminal 3, and a communication network NT. The image forming apparatus 2 and the terminal 3 can be connected to each other via the communication network NT. A Local Area Network (LAN), the Internet, a public line, a dedicated line, or the like may be used as the communication network NT.

The image forming apparatus 2 and the terminal 3 are configured to access a web server 5 on the Internet to download a web page therefrom.

The image forming apparatus 2 is a device that integrates a variety of functions, such as copying, scanning, faxing, network printing, document server, file transferring, and so on, into a single unit. Such apparatuses are sometimes called as Multi-Function Peripherals (MFPs).

Referring to FIG. 2, the image forming apparatus 2 is configured of a Central Processing Unit (CPU) 20a, a Random Access Memory (RAM) 20b, a Read-Only Memory (ROM) 20c, a hard disk 20d, a control circuit 20e, an operational panel 20f, a communication interface 20g, a printing device 20h, a scanner 20i, and so on.

The scanner 20i is a device that optically reads images printed on paper, such as photographs, characters, drawings, diagrams, and the like, and creates image data thereof.

The printing device 20h is a device that prints an image onto paper based on the image data obtained by scanning with the scanner 20i or image data transmitted from another device.

The communication interface 20g is a Network Interface Card (NIC) for communicating with the terminal 3 and a web server on the Internet based on a Transmission Control Protocol/Internet Protocol (TCP/IP), and a modem for communicating with a fax terminal based on a facsimile protocol.

The operational panel 20f is configured of a touch panel, a numerical keypad, a start button, a stop button, and so on.

The control circuit 20e is a circuit for controlling devices such as the hard disk 20d, the scanner 20i, the printing device 20h, the communication interface 20g, and the operational panel 20f.

The terminal 3 is a personal computer, a workstation, or the like. As with the image forming apparatus 2, the terminal 3 is configured of a CPU, a RAM, a ROM, a hard disk, a control circuit, a communication interface, and so on. Further, the terminal 3 includes an input device such as a keyboard or a mouse, and a display DP functioning as a display device. As illustrated in FIG. 3, stored in the hard disk of the terminal 3 are programs and data for implementing functions of a data obtaining portion 301, a data storage portion 302, an improper web page attribute storage portion 303, a code analysis portion 304, a web page data obtaining portion 305, a relevant degree calculation portion 306, an authenticity determination portion 307, a print control portion 308, an improper web page registration process portion 309, a display control portion 310, and the like. These programs and data are loaded into the RAM as necessary, whereupon the programs are executed by the CPU. Thereby, processes in the respective portions are functionally implemented as illustrated in flowcharts described later.

A web page browser application is installed on the hard disk of the terminal 3, which enables the terminal 3 to obtain files of a web page published on the Internet and display the web page on the display DP.

Further, a driver for the image forming apparatus 2 is installed on the hard disk of the terminal 3, which allows the terminal 3 to instruct the image forming apparatus 2 to perform printing and to obtain image data scanned by the image forming apparatus 2.

Each of the image forming apparatus 2 and the terminal 3 functions as an image processing apparatus according to the present invention.

Figure 4:
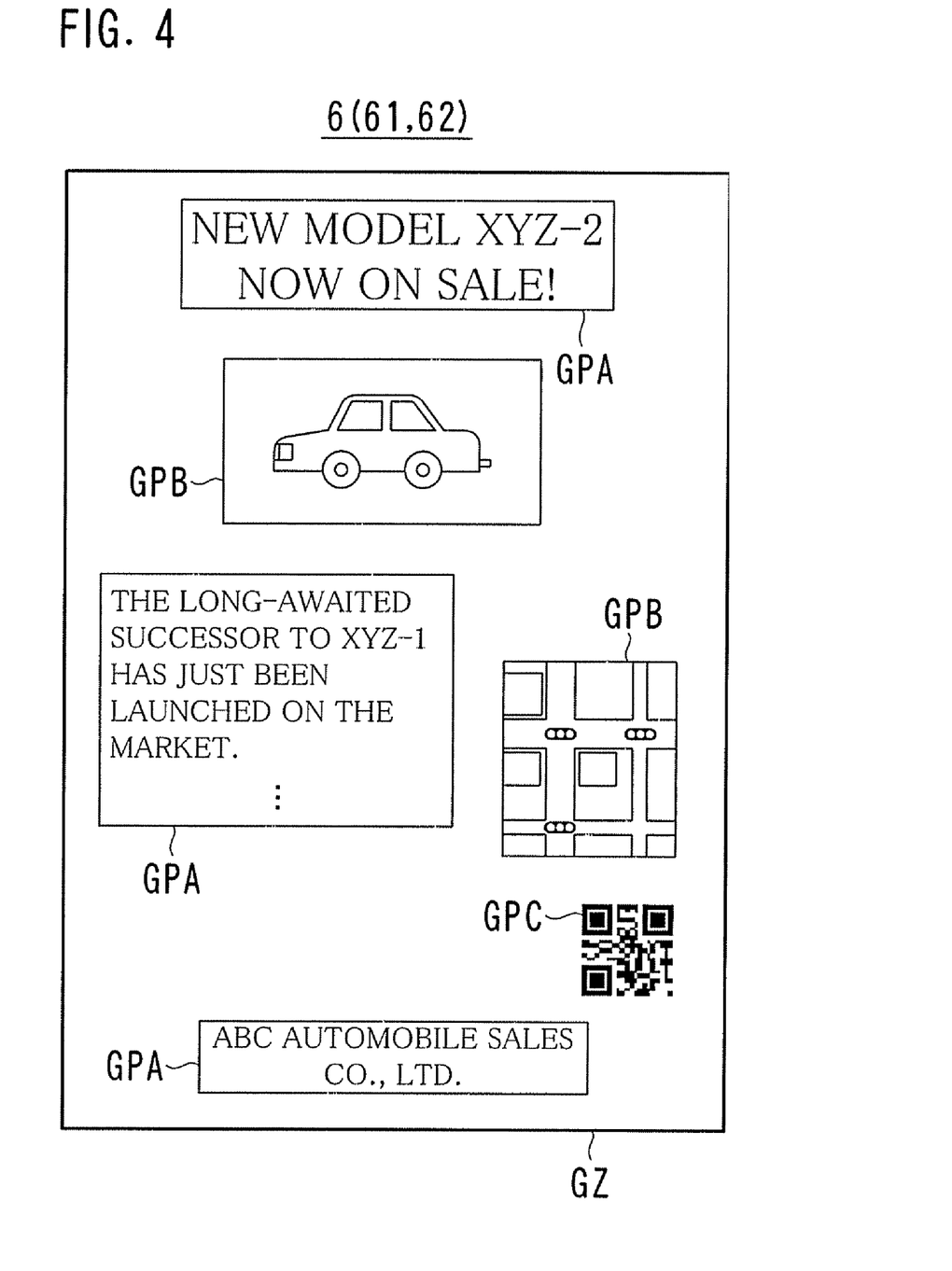
FIG. 4 is a diagram illustrating an example of the entire image of a brochure.
Figure 5:
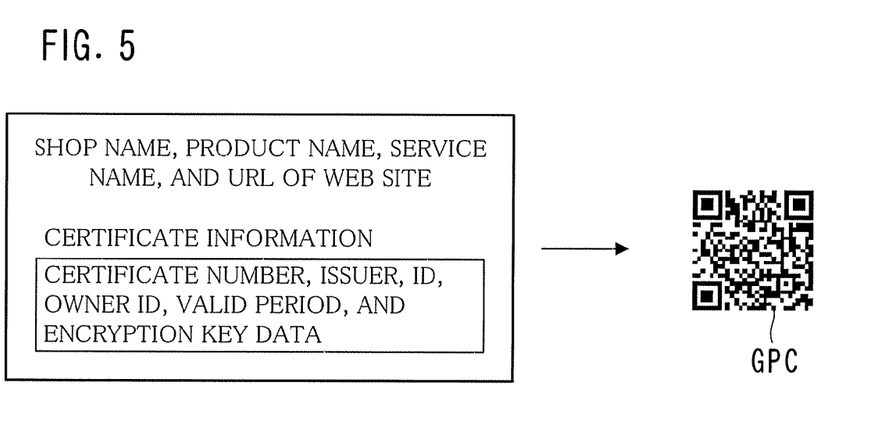
FIG. 5 is a diagram illustrating an example of the appearance of a QR code and information represented therein.
Figure 6:
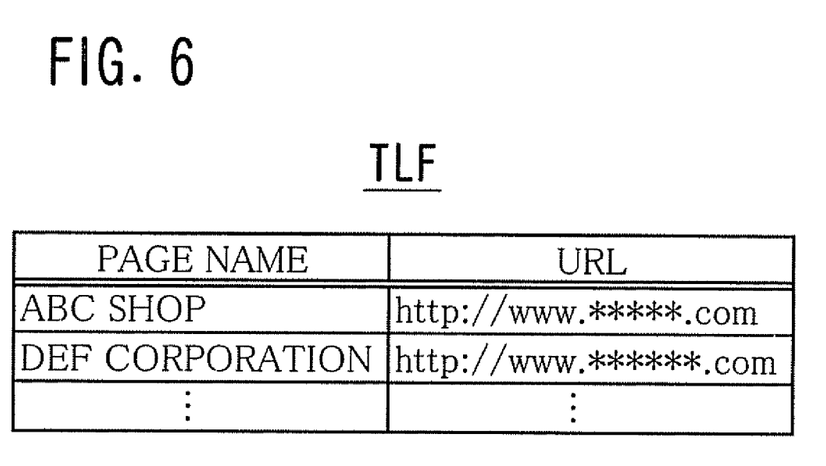
FIG. 6 is a diagram illustrating an example of an improper web page table.
Figure 7:
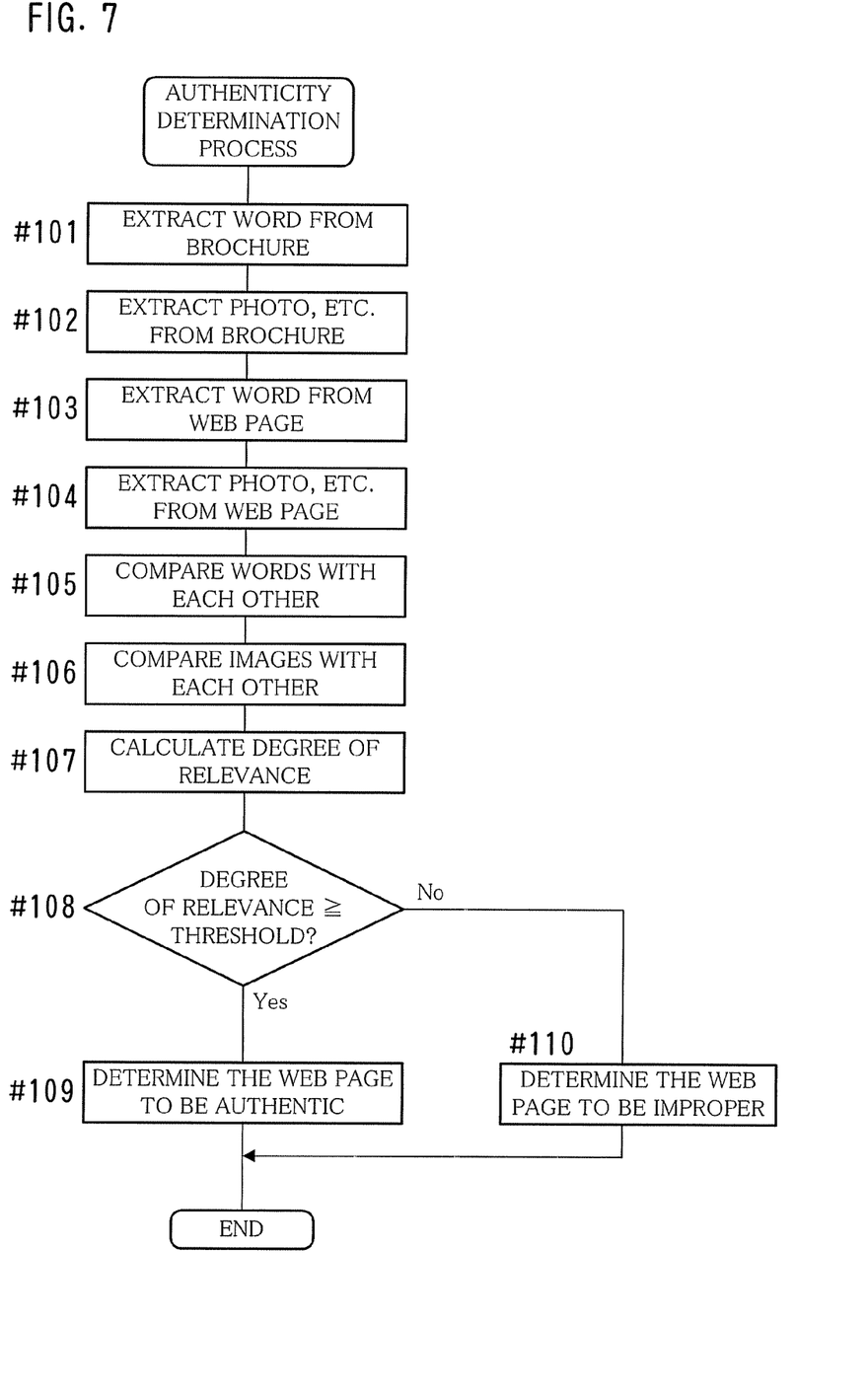
FIG. 7 is a flowchart illustrating an example of the flow of an authenticity determination process.
Figure 8:
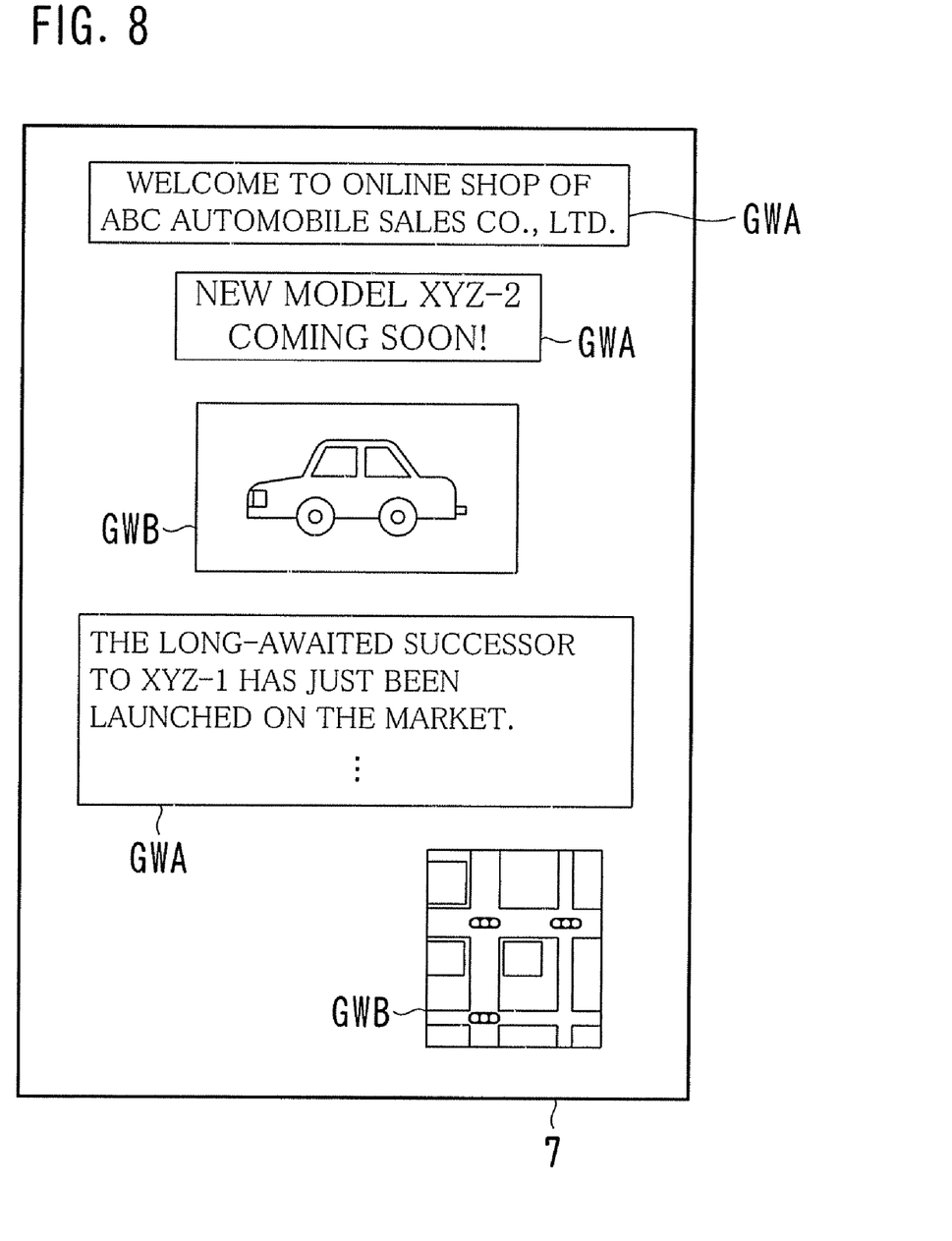
FIG. 8 is a diagram illustrating an example of a linked web page.
Figure 9:
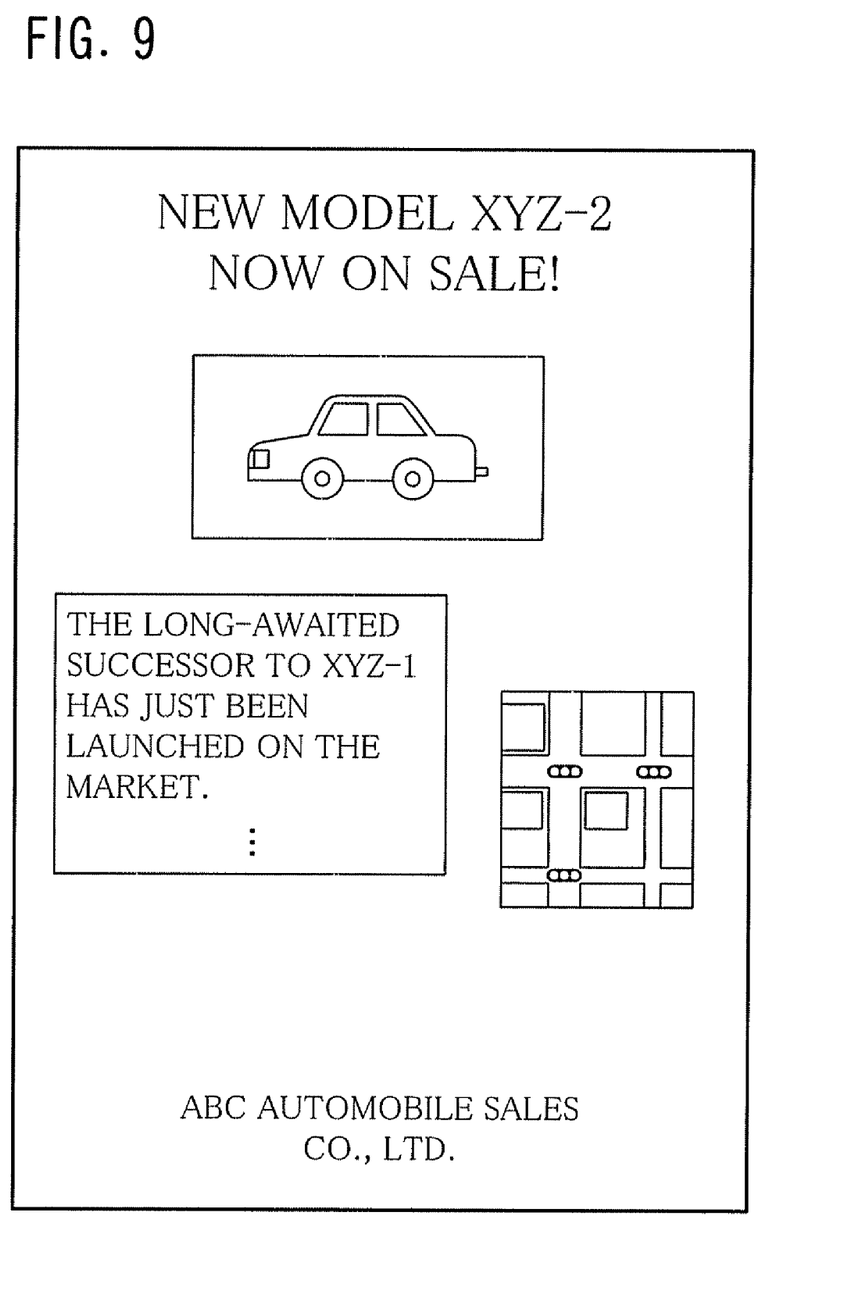
FIG. 9 is a diagram illustrating an example of a printed material in which a QR code is excluded.

FIG. 4 is a diagram illustrating an example of an entire image GZ of a brochure 6; FIG. 5 is a diagram illustrating an example of the appearance of a QR code GPC and information represented therein; FIG. 6 is a diagram illustrating an example of an improper web page table TLF; FIG. 7 is a flowchart illustrating an example of the flow of an authenticity determination process; FIG. 8 is a diagram illustrating an example of a linked web page 7; and FIG. 9 is a diagram illustrating an example of a printed material in which the QR code GPC is excluded.

The following is a description of a processing flow of the image forming apparatus 2 and the terminal 3 by taking an example in which a user operates the terminal 3 to cause the image forming apparatus 2 to print the brochure 6 containing the contents as exemplified in FIG. 4.

The brochure 6 is a paper brochure or an electronic brochure. Hereinafter, the paper brochure and the electronic brochure may be stated by respectively differentiating them as a "paper brochure 61" and an "electronic brochure 62".

On the paper brochure 61 are printed a character string specifying a company name or a shop name, a character string specifying a product name or a service name, and a character string specifying the detailed description of a product or service. Further, a photograph or picture of a product, a map or logo of the company or shop, or the like is printed on the paper brochure 61. Moreover, a Quick Response (QR) code is also printed on the paper brochure 61.

The electronic file 62 is an electronic file for reproducing an image having contents similar to the contents printed on (contained in) the paper brochure 61. The format of the electronic brochure 62 is, for example, a PDF.

Hereinafter, the entire image printed on the paper brochure 61 or the entire image of the electronic brochure 62 is referred to as an "entire image GZ". An image, of the entire image GZ, corresponding to a character string (including a case of only one character) is referred to as a "character string image GPA". A QR code in the entire image GZ is referred to as a "QR code GPC". An image other than the QR code and the character string, e.g., a photograph, a picture, a map, or a logo, is referred to as a "non-character string image GPB".

The QR code GPC represents, at least, a Uniform Resource Locator (URL). Further, as illustrated in FIG. 5, the QR code GPC may represent the name of a company or shop on behalf of which the brochure 6 is published (hereinafter such a company or shop is referred to as an "advertiser"), the name of a product or service offered by the advertiser, and an electronic certificate of the advertiser. Hereinafter, a web page corresponding to the URL represented in the QR code GPC, i.e., a web page whose location is specified by the URL, is referred to as a "linked web page 7".

Referring to FIG. 3, the data obtaining portion 301 of the terminal 3 obtains the brochure 6 in the form of electronic file, i.e., the electronic brochure 62, by downloading the same from the web server 5 or by reading out the same from a recording medium such as a CD-ROM. Alternatively, the data obtaining portion 301 obtains the electronic brochure 62 by causing the image forming apparatus 2 to scan the paper brochure 61 to digitize the same, or in other words, by causing the image forming apparatus 2 to convert the paper brochure 61 into the electronic brochure 62 and receiving the electronic brochure 62 thus converted.

The data storage portion 302 saves the electronic brochure 62 thus obtained by the data obtaining portion 301.

The improper web page attribute storage portion 303 saves the improper web page table TLF for recording improper web pages therein.

As illustrated in FIG. 6, in the improper web page table TLF are stored records each of which corresponds to a web page that is determined to be an improper web page by the authenticity determination portion 307 described later. Each of the records indicates a title of a web page corresponding to the record, i.e., a page name thereof, a URL thereof, and the like.

The code analysis portion 304 analyzes the QR code GPC included in the entire image GZ reproduced based on the electronic brochure 62 designated by a user to obtain information, such as a URL, represented in the QR code GPC.

The web page data obtaining portion 305 obtains (downloads), from the web server 5, files for reproducing a web page corresponding to the URL obtained (analyzed) by the code analysis portion 304, i.e., files for reproducing the linked web page 7. Such files are, for example, a Hypertext Markup Language file and an image file contained therein.

The relevant degree calculation portion 306 compares the contents of the entire image GZ except the QR code GPC reproduced based on the electronic brochure 62 with the contents of the linked web page 7 reproduced based on the files obtained by the web page data obtaining portion 305; thereby to calculate a degree of connection (similarity) therebetween. Such a degree is hereinafter referred to as a "degree of relevance". A method for obtaining a degree of relevance is described later.

The authenticity determination portion 307 performs a process for verifying the authenticity of the linked web page 7 obtained by the web page data obtaining portion 305. Such a determination process includes the following three phases.

Phase 1: If the URL of the linked web page 7 is indicated in any of the records stored in the improper web page table TLF, then it is determined that the linked web page 7 is an improper web page. Then, the determination process is finished.

Phase 2: In the case where, in Phase 1, it has not been determined that the linked web page 7 is an improper web page, it is checked whether or not an electronic certificate obtained by the code analysis portion 304 based on the QR code GPC is an authentic certificate. If the electronic certificate is not an authentic certificate, it is determined that the linked web page 7 is an improper web page. Then, the determination process is finished. If no electronic certificate is represented in the QR code GPC, it is possible to determine that the linked web page 7 is an improper web page, or the determination process may be pending and the determination may be made based on a result of the subsequent Phase 3. The same applies to the case where it is difficult to make a determination as to whether or not an electronic certificate is an authentic certificate, e.g., the case where an electronic certificate expires. If an electronic certificate is associated with the linked web page 7, it is possible to receive the electronic certificate and to make a determination based on the electronic certificate thus received.

Phase 3: In the case where, in Phase 2, it has not been determined that the linked web page 7 is an improper web page, a determination is made based on a degree of relevance determined by the relevant degree calculation portion 306 as described above. The following is a description of the process performed by the relevant degree calculation portion 306 and the process of Phase 3 performed by the authenticity determination portion 307 with reference to FIG. 7.

As illustrated in FIG. 8, as with the entire image GZ of the brochure 6, the linked web page 7 contains images of objects such as character strings, a photograph, a picture, a map, or a logo. Hereinafter, an image, in the linked web page 7, corresponding to a character string is referred to as a "character string image GWA". An image other than the character string is referred to as a "non-character string image GWB".

Referring to FIG. 7, the relevant degree calculation portion 306 extracts character string images GPA from the entire image GZ of an electronic brochure 62, recognizes character strings contained in the character string images GPA thus extracted, and extracts words included in the character strings, e.g., a company name, a shop name, a product name or a service name (#101). The relevant degree calculation portion 306 further extracts non-character string images GPB from the entire image GZ (#102).

The relevant degree calculation portion 306 recognizes character strings contained in character string images GWA included in a linked web page 7, and extracts words included in the character strings thus recognized (#103). The relevant degree calculation portion 306 extracts non-character string images GWB from the linked web page 7 (#104). Such non-character string images GWB can be extracted based on a predetermined identifier such as ".jpg" or ".gif" in files of the linked web page 7.

The relevant degree calculation portion 306 compares the words extracted from the character string images GPA of the entire image GZ with the words extracted from the character string images GWA of the linked web page 7, and counts the number of combinations of matched words (#105).

The relevant degree calculation portion 306 compares the non-character string images GPB of the entire image GZ with the non-character string images GWB of the linked web page 7, and counts the number of combinations of matched images (#106). A determination as to whether or not both the images match can be made, for example, by performing pattern matching. In this case, it is possible to determine that both the images match when they are similar to some extent even if they do not match perfectly.

In that case, taking into consideration of the size difference between both the images, pattern matching may be performed after enlarging or reducing either one or both of the images. Alternatively, taking into consideration of the difference between a color image and a monochrome image, pattern matching may be performed after converting a color image into a monochrome image. Further alternatively, pattern matching may be performed after reducing a resolution or a gradation level of either one or both of the images.

Other methods may be employed instead of the pattern matching. For example, the comparison may be made based on characteristic points of the respective images. Alternatively, information specifying the images such as a background pattern image may be extracted and the comparison may be made based on the information thus extracted.

Further, the relevant degree calculation portion 306 determines a degree of relevance between the entire image GZ other than the QR code GPC and the linked web page 7 based on the results of the comparison in Step #105 and Step #106 (#107).

For example, a ratio of the number of combinations of matched words/images to the number of all the combinations of compared words/images may be defined as a degree of relevance.

Alternatively, a degree of relevance may be determined by the following method. First, a ratio of the number of combinations of matched words (i.e., words present both in the entire image GZ and the linked web page 7) to the number of words extracted from the character string images GPA, to the number of words extracted from the character string images GWA, or to the total thereof is calculated. Next, a ratio of the number of combinations of non-character string images GPB and non-character string images GWB that match each other to the number of non-character string images GPB, to the number of non-character string images GWB, or to the total thereof is calculated. Then, the average value of both the ratios thus calculated is determined to be a degree of relevance.

When a degree of relevance determined by the relevant degree calculation portion 306 is equal to or greater than a predetermined threshold (Yes in #108), the authenticity determination portion 307 determines that the linked web page 7 is an authentic web page, i.e., is related to the electronic brochure 62 (#109). On the other hand, when a degree of relevance determined by the relevant degree calculation portion 306 is lower than the predetermined threshold (No in #108), the authenticity determination portion 307 determines that the linked web page 7 is an improper web page, i.e., is not related to the electronic brochure 62 (#110).

Referring back to FIG. 3, the print control portion 308 and the improper web page registration process portion 309 perform the following processes based on the result of the determination performed by the authenticity determination portion 307.

When the authenticity determination portion 307 determines that the linked web page 7 corresponding to the URL represented in the QR code GPC contained in the entire image GZ of the electronic brochure 62 is an improper web page, the print control portion 308 instructs the image forming apparatus 2 to print the entire image GZ with the QR code GPC excluded. At this time, the print control portion 308 transmits the electronic brochure 62 to the image forming apparatus 2. Alternatively, the print control portion 308 may generate image data of an image obtained by excluding the QR code GPC from the entire image GZ to transmit the resultant image data to the image forming apparatus 2.

On the other hand, when the authenticity determination portion 307 determines that the linked web page 7 is an authentic web page, the print control portion 308 instructs the image forming apparatus 2 to print the entire image GZ as-is, i.e., the entire image GZ without excluding the QR code GPC therefrom. In this case also, the print control portion 308 transmits the electronic brochure 62 to the image forming apparatus 2.

When it is determined that the linked web page 7 is an improper web page, the improper web page registration process portion 309 generates a new record indicating a title and URL of the linked web page 7 and registers the record thus generated in the improper web page table TLF. However, when it is determined, in Phase 1 described above, that the linked web page 7 is an improper web page, it is unnecessary to generate such a new record because a record indicating the URL of the linked web page 7 is already registered in the improper web page table TLF.

Responding to the instructions and the electronic brochure 62 transmitted by the terminal 3, the image forming apparatus 2 prints the entire image GZ based thereon. To be more specific, when the image forming apparatus 2 is instructed to print the entire image GZ with the QR code GPC excluded, it excludes the QR code GPC from the entire image GZ reproduced based on the electronic brochure 62 and prints the resultant entire image GZ. If this is not the case, the image forming apparatus 2 performs printing as before.

The display control portion 310 displays, on the display DP, the linked web page 7 of the electronic brochure 62 obtained by the data obtaining portion 301. The display control portion 310 may display the linked web page 7 on the display DP at a time when the electronic brochure 62 is obtained, or at a time when a user enters a command to display the linked web page 7 based on the QR code GPC included in the electronic brochure 62 obtained by the data obtaining portion 301.

However, before displaying the linked web page 7, the display control portion 310 causes, for example, the authenticity determination portion 307 to verify the authenticity of the linked web page 7 corresponding to the URL of the QR code GPC included in the entire image GZ. A method for such a verification is the same as the case of printing as discussed above. If it is determined that the linked web page 7 is an authentic web page, then the display control portion 310 displays the linked web page 7 on the display DP. If it is determined that the linked web page 7 is an improper web page, then the display control portion 310 stops displaying the linked web page 7, and displays, on the display DP, a message notifying a user that the linked web page 7 is an improper web page.

Figure 10:
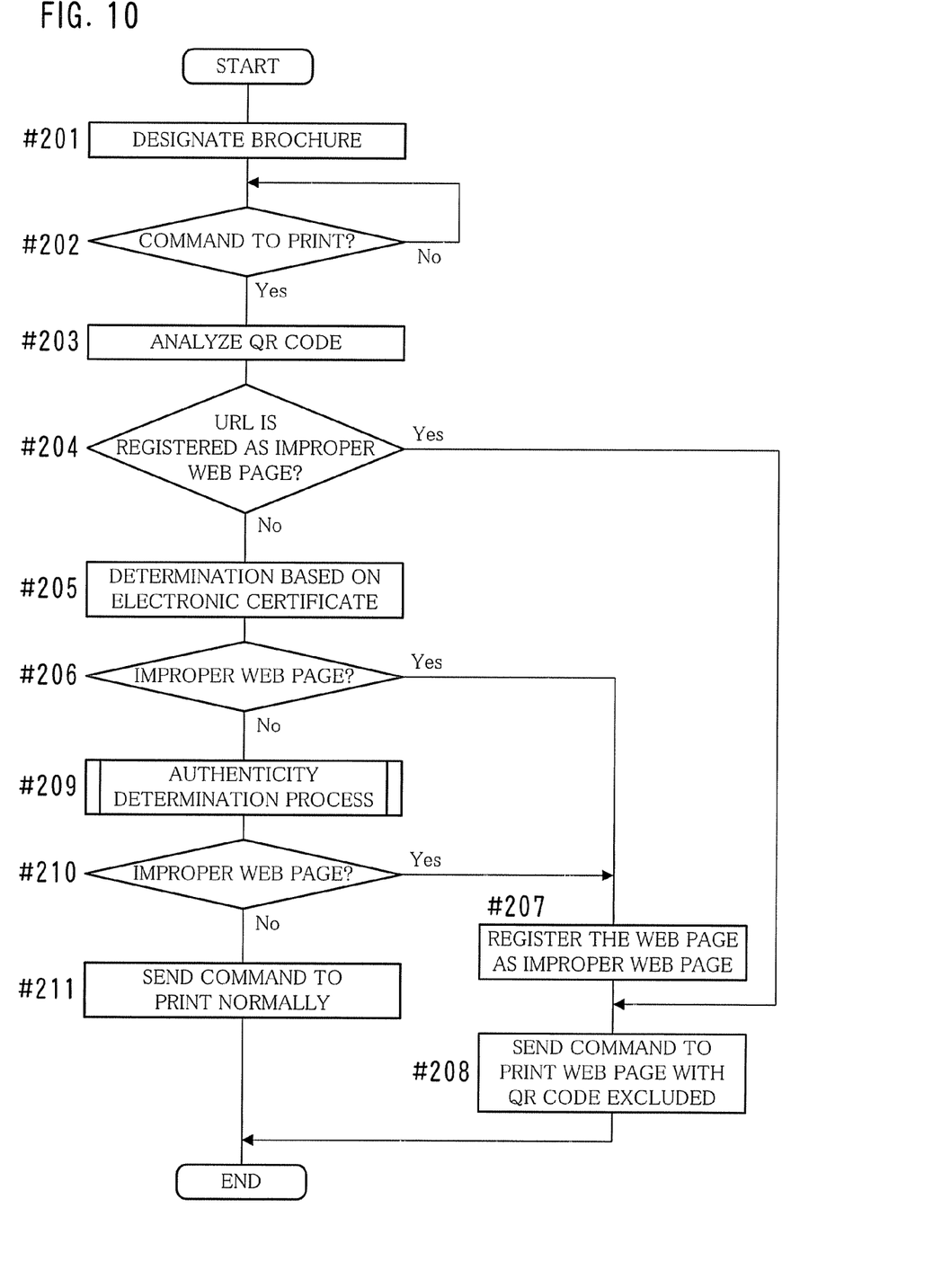
FIG. 10 is a flowchart illustrating an example of the flow of a process performed by a terminal when an image forming apparatus prints the entire image of a brochure.

FIG. 10 is a flowchart illustrating an example of the flow of a process performed by the terminal 3 when the image forming apparatus 2 prints the entire image GZ of the brochure 6.

The user designates a desired electronic brochure 62 among electronic brochures 62 stored in the data storage portion 302 and instructs the terminal 3 to perform printing thereof.

When receiving the designation and instructions from the user (#201 and Yes in #202), the terminal 3 analyzes a QR code GPC included in the entire image GZ of the electronic brochure 62 designated by the user, and obtains a URL of the linked web page 7 (#203).

If the URL thus obtained is registered in the improper web page table TLF (see FIG. 6) (Yes in #204), then the terminal 3 transmits, to the image forming apparatus 2, the electronic brochure 62, and instructs the image forming apparatus 2 to print the entire image GZ with the QR code GPC excluded (#208).

If the URL thus obtained is not registered in the improper web page table TLF (No in #204), then the terminal 3 verifies the authenticity of the linked web page 7 based on an electronic certificate (#205). If it is determined that the linked web page 7 is an improper web page (Yes in #206), the terminal 3 transmits, to the image forming apparatus 2, the electronic brochure 62, and instructs the image forming apparatus 2 to print the entire image GZ with the QR code GPC excluded (#208).

If it is not determined that the linked web page 7 is an improper web page even by using the improper web page table TLF and the electronic certificate (No in #204 and No in #206), then the terminal 3 compares (checks) the entire image GZ except the QR code GPC with the linked web page 7, and verifies the authenticity of the linked web page 7 (#209). The procedure in this case is as described earlier with reference to FIG. 7. Then, if it is determined that the linked web page 7 is an improper web page (Yes in #210), then the terminal 3 transmits the electronic brochure 62 to the image forming apparatus 2 and instructs the image forming apparatus 2 to print the entire image GZ with the QR code GPC excluded (#208). Further, in parallel with the transmission/instructions or before or after the same, the terminal 3 generates a record indicating, for example, a URL of the linked web page 7 and registers the record thus generated in the improper web page table TLF (#207).

On the other hand, if it is determined that the linked web page 7 is an authentic web page as a result of the comparison/check between the entire image GZ except the QR code GPC and the linked web page 7 (No in #210), the terminal 3 transmits the electronic brochure 62 to the image forming apparatus 2 and instructs the image forming apparatus 2 to print the entire image GZ without excluding the QR code GPC therefrom (#211).

Based on the instructions and the electronic brochure 62 transmitted by the terminal 3, the image forming apparatus 2 prints the entire image GZ, after excluding the QR code GPC therefrom if necessary.

Figure 11:
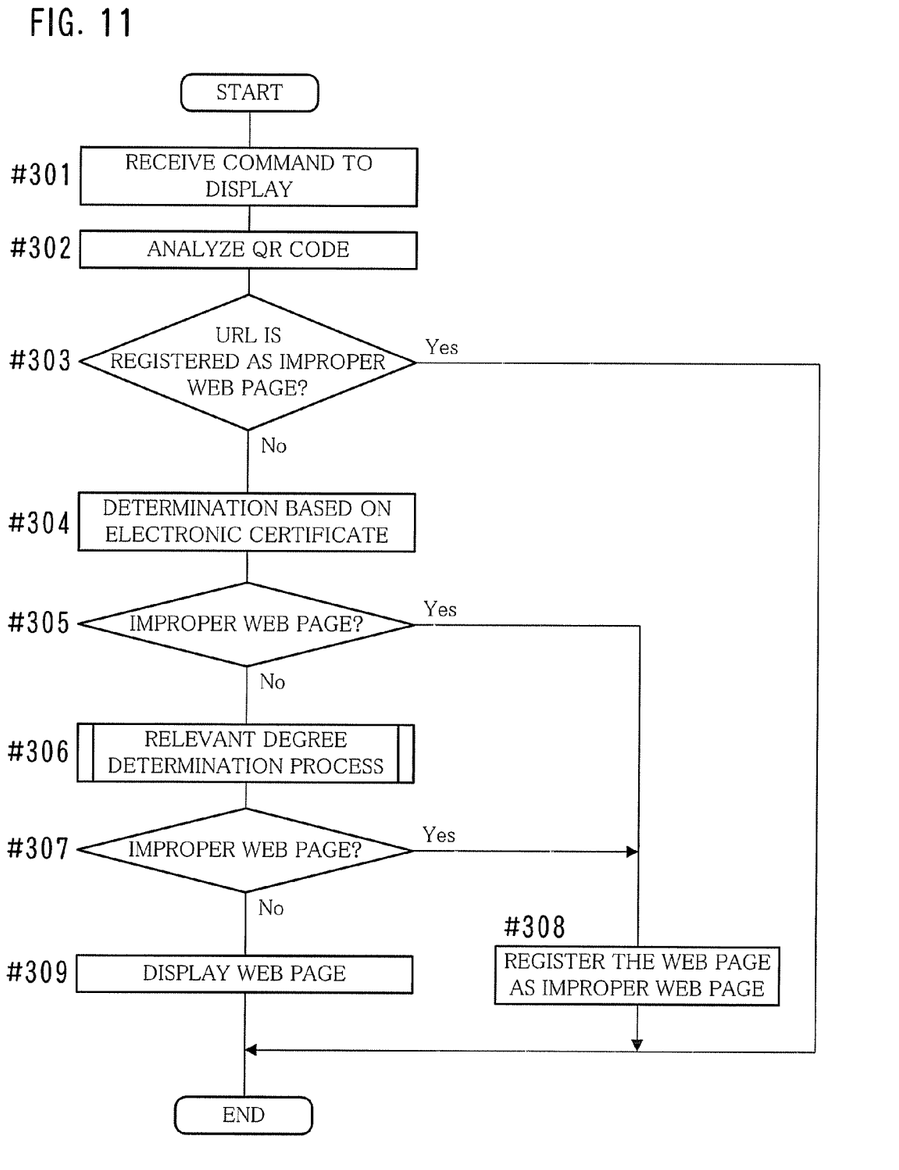
FIG. 11 is a flowchart illustrating an example of the flow of a process performed by a terminal when an image forming apparatus prints a linked web page.

FIG. 11 is a flowchart illustrating an example of the flow of a process performed by the terminal 3 when the image forming apparatus 2 prints the linked web page 7.

As described earlier, a user can display, on the display DP, the linked web page 7 represented in the QR code GPC contained in the electronic brochure 62 at a time when the electronic brochure 62 is inputted to the terminal 3, or at a time when the user intends to display the linked web page 7 on the display DP based on the QR code GPC contained in the electronic brochure 62. A description is given below of the whole processing flow of the terminal 3 in such a case with reference to the flowchart illustrated in FIG. 11.

When obtaining the electronic brochure 62 from an external device or the like, or receiving instructions to display the linked web page 7 from a user (#301), the terminal 3 analyzes the QR code GPC contained in the entire image GZ of the electronic brochure 62 and obtains the URL of the linked web page 7 (#302). As with the case of printing, which is described earlier with reference to FIG. 10, it is determined whether or not the linked web page 7 is an authentic web page (#303 through #307).

If it is determined that the linked web page 7 is an improper web page (Yes in #307), then the terminal 3 registers the URL of the linked web page 7 in the improper web page table TLF (#308), and stops displaying the linked web page 7. At this time, the terminal 3 may display, on the display DP, a message notifying the user that the linked web page 7 is an improper web page.

On the other hand, if it is determined that the linked web page 7 is an authentic web page (No in #307), then the terminal 3 displays the linked web page 7 on the display DP (#309).

The linked web page 7 may be printed onto paper instead of being displayed on the display DP. In such a case, as with the case of the method described with reference to FIG. 11, it is determined whether or not the linked web page 7 is an authentic web page. Then, if it is determined that the linked web page 7 is an authentic web page, the image forming apparatus 2 may be caused to perform a process of printing the linked web page 7 onto paper. If it is determined that the linked web page 7 is an improper web page, such a printing process may be stopped.

Embodiment in Which the Image Forming Apparatus 2 Implements the Functions of the Terminal 3

Another configuration may be employed in which the image forming apparatus 2 performs the functions of the terminal 3 described in the foregoing embodiment. The following is a description of the case where the image forming apparatus 2 implements the functions of the terminal 3.

Figure 12:
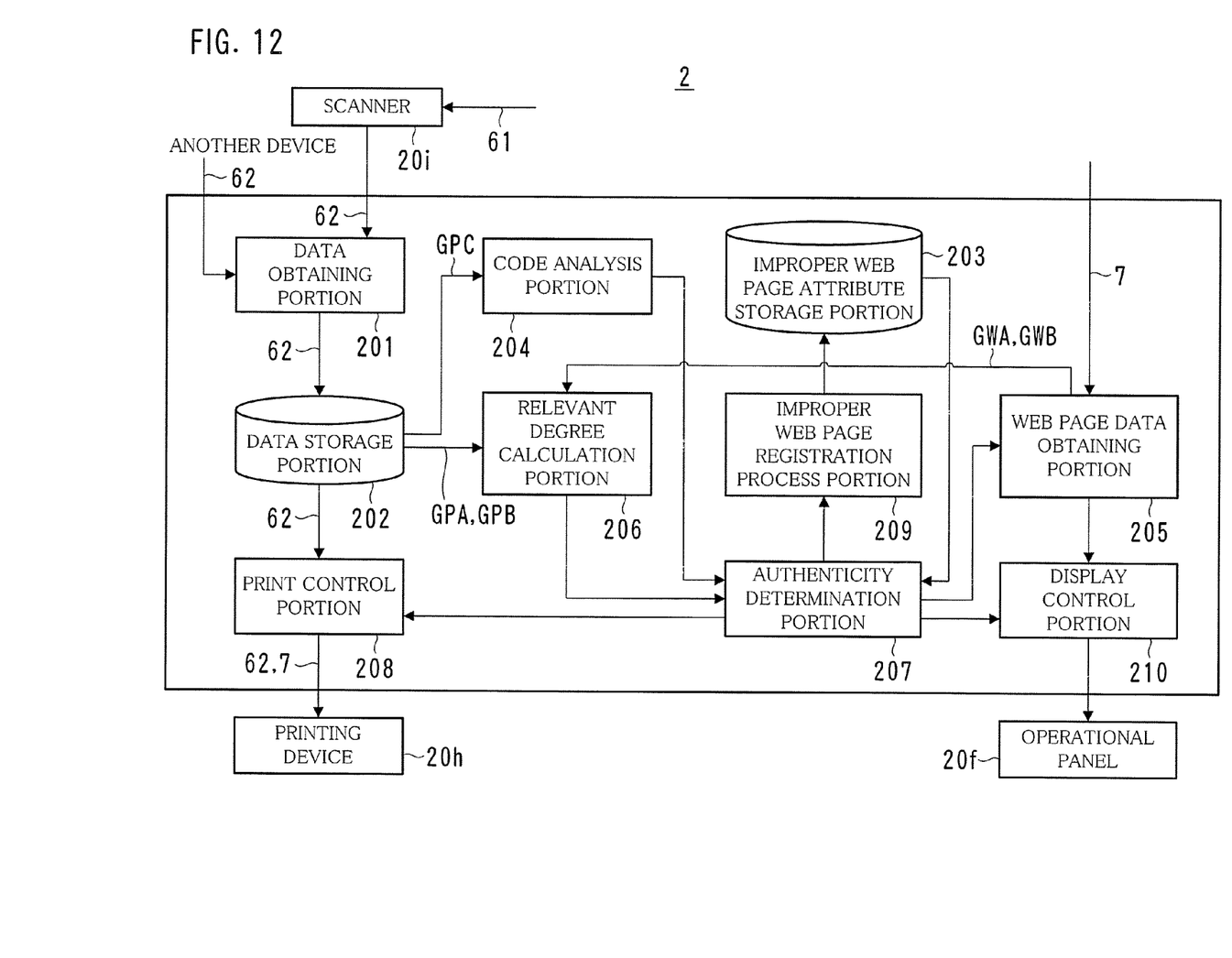
FIG. 12 is a diagram illustrating an example of the functional configuration of an image forming apparatus.

FIG. 12 is a diagram illustrating an example of the functional configuration of an image forming apparatus 2 according to this embodiment. The image forming apparatus 2 according to this embodiment has the same hardware configuration as that of the image forming apparatus 2 illustrated in FIG. 2.

As illustrated in FIG. 12, stored in the hard disk 20d of the image forming apparatus 2 are programs and data for implementing functions of a data obtaining portion 201, a data storage portion 202, an improper web page attribute storage portion 203, a code analysis portion 204, a web page data obtaining portion 205, a relevant degree calculation portion 206, an authenticity determination portion 207, a print control portion 208, an improper web page registration process portion 209, a display control portion 210, and the like. These programs and data are loaded into the RAM 20b as necessary, whereupon the programs are executed by the CPU 20a.

Thereby, processes in the respective portions, which are described later with reference to flowcharts, are functionally implemented. Note that the whole or a part of the functions of the respective portions may be implemented by a hardware circuit such as an Application Specific Integrated Circuit (ASIC).

The following is a description of the contents to be processed by the respective portions of the image forming apparatus 2 by taking an example in which the entire image GZ is copied by scanning the paper brochure 61 or in which the linked web page 7 is displayed or printed. A description of points common to the functions of the terminal 3 in the embodiment described earlier shall be omitted.

The data obtaining portion 201 obtains image data of the entire image GZ by causing the scanner 20i to scan the paper brochure 61 placed on a document glass in accordance with user's instructions to scan the paper brochure 61 through the operational panel 20f. The image data thus obtained is stored in the data storage portion 202.

The improper web page attribute storage portion 203, the code analysis portion 204, the web page data obtaining portion 205, the relevant degree calculation portion 206, the authenticity determination portion 207, the improper web page registration process portion 209, and the display control portion 210 perform the same processes as, respectively, those of the improper web page attribute storage portion 303, the code analysis portion 304, the web page data obtaining portion 305, the relevant degree calculation portion 306, the authenticity determination portion 307, the improper web page registration process portion 309, and the display control portion 310 of the terminal 3 as illustrated in FIG. 3.

More specifically, the improper web page attribute storage portion 203 stores and manages the improper web page table TLF.

The code analysis portion 204 analyzes a QR code GPC contained in the entire image GZ obtained by the data obtaining portion 201 and obtains a URL represented in the QR code GPC.

The web page data obtaining portion 205 accesses a linked web page 7 corresponding to the URL thus obtained. Stated differently, the web page data obtaining portion 205 obtains files for reproducing the linked web page 7.

The relevant degree calculation portion 206 compares the entire image GZ with the linked web page 7, thereby to calculate a degree of relevance therebetween.

The authenticity determination portion 207 verifies the authenticity of the linked web page 7 based on the degree of relevance thus calculated.

The improper web page registration process portion 209 registers, in the improper web page table TLF, for example, a URL of the linked web page 7 that has been determined to be an improper web page.

When the authenticity determination portion 207 determines that the linked web page 7 is an improper web page, the print control portion 208 controls the printing device 20h to perform a process of printing (copying), onto paper, the entire image GZ with the QR code GPC excluded. On the other hand, when the authenticity determination portion 207 determines that the linked web page 7 is an authentic web page, the print control portion 208 controls the printing device 20h to perform a process of printing (copying) the entire image GZ, as-is, without excluding the QR code GPC therefrom.

The flow of the entire process performed by the image forming apparatus 2 when it copies the paper brochure 61 is basically the same as that of the terminal 3 described earlier with reference to FIG. 10. However, in Step #208 and Step #211 of FIG. 10, the image forming apparatus 2 itself makes printing (copying) instead of sending a command to make printing.

The image forming apparatus 2 according to this embodiment has the following mode: Scanning the paper brochure 61 and analyzing the QR code GPC contained in the paper brochure 61; thereby to cause the printing device 20h to print the linked web page 7 or to display the linked web page 7 on the operational panel 20f. In the case where that mode is used to print or display the linked web page 7 represented in the QR code GPC contained in the paper brochure 61, the data obtaining portion 201 of the image forming apparatus 2 scans the paper brochure 61 placed on a document glass and obtains image data of the entire image GZ in accordance with designation and entry of that mode performed by a user through the operational panel 20f. Then, as with the case where the terminal 3 displays the linked web page 7 as described earlier with reference to Step #302 through Step #309 of FIG. 11, the image forming apparatus 2 verifies the authenticity of the linked web page 7, and prints or displays the linked web page 7 depending on the result of the verification. To be more specific, if it is determined that the linked web page 7 is an authentic web page, then the image forming apparatus 2 prints or displays the same. Conversely, if it is determined that the linked web page 7 is an improper web page, then the image forming apparatus 2 neither prints nor displays the same.

According to the embodiments discussed above, before printing a brochure containing the entire image GZ including a QR code, the terminal 3 or the image forming apparatus 2 (an image processing apparatus) compares the contents of the entire image GZ other than the QR code with the contents of a web page corresponding to a URL represented in the QR code. Then, if the comparison result indicates that there is not less than a certain degree of relevance between both the contents, a brochure (the entire image GZ) with the QR code remaining included is printed or a command to print such a brochure is issued. Then, if the comparison result indicates that there is less than a certain degree of relevance between both the contents, the entire image GZ with the QR code excluded is printed or a command to print the entire image GZ with the QR code excluded is issued. Thus, it is possible to prevent a brochure to which a QR code leading a viewer of the brochure to an improper web page is added from being distributed as compared to the conventional apparatus or method.

Further, if a web page corresponding to a QR code is an improper web page, the terminal 3 or the image forming apparatus 2 (an image processing apparatus) neither displays nor prints the improper web page. Consequently, it is possible to prevent a web page containing meaningless or undesirable contents for a user from being outputted more surely than is conventionally possible.

In the embodiments described above, the descriptions are provided of the examples of the case where a QR code is used as code data representing a URL. Instead, however, a different code data such as a bar code or steganography may be used as code data representing a URL. Further, in the embodiments described above, the paper brochure 61 or the electronic brochure 62 is exemplified as a document or image data containing a QR code. The present invention, however, is not limited to the application to such a brochure, and is generally applicable to documents or image data containing code data, such as a QR code, representing the location of a web page.

The improper web page table TLF may be shared by a plurality of users. Alternatively, the improper web page table TLF may be prepared for each user so that the improper web page tables TLF for the users are properly used.

In the embodiments described above, a terminal and a Multi-Function Peripheral (MFP) are used as image processing apparatuses. However, devices other than the terminal and the Multi-Function Peripheral (MFP) are possible, provided that such devices have an image reading function and a web browser function. For example, the image processing apparatus may be a digital MFP, a network scanner, a facsimile device, or the like.

In the embodiments discussed above, the overall configuration of the information processing system 1, the image forming apparatus 2 and the terminal 3, the configurations of various portions thereof, the function, the content to be processed, the processing order, the structure and contents of the table, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus comprising:
    an image obtaining portion that obtains an image including a code, the code representing a location of a web page;
    a web page obtaining portion that obtains the web page based on the code included in the obtained image;
    a calculation portion that compares the obtained image except the code with the obtained web page to calculate a degree of relevance between the obtained image except the code and the obtained web page; and
    a print controller that issues a command to print the obtained image with the code excluded if the degree of relevance is lower than a predetermined threshold, and to print the obtained image without excluding the code if the degree of relevance is equal to or greater than the predetermined threshold.

2. The image processing apparatus according to claim 1, wherein the image obtaining portion obtains the image by receiving image data of the image from an external device.

3. The image processing apparatus according to claim 1, further comprising a display portion that prohibits the obtained web page from being displayed if the degree of relevance is lower than the predetermined threshold, and displays the obtained web page if the degree of relevance is equal to or greater than the predetermined threshold.

4. The image processing apparatus according to claim 1, wherein the print controller prohibits the obtained web page from being printed if the degree of relevance is lower than the predetermined threshold, and issues a command to print the obtained web page if the degree of relevance is equal to or greater than the predetermined threshold.

5. The image processing apparatus according to claim 1, wherein the image obtaining portion obtains the image by scanning the image carried on paper.

6. The image processing apparatus according to claim 5, further comprising a printer that prints the obtained image in accordance with the command issued by the print controller.

7. An image processing method performed in an image processing apparatus, the method comprising:
  an image obtaining step of obtaining an image including a code, the code representing a location of a web page;
  a web page obtaining step of obtaining the web page based on the code included in the obtained image;
  a calculation step of using a processor to compare the obtained image except the code with the obtained web page to calculate a degree of relevance between the obtained image except the code and the obtained web page; and
  a print control step of issuing a command to print the obtained image with the code excluded if the degree of relevance is lower than a predetermined threshold, and to print the obtained image without excluding the code if the degree of relevance is equal to or greater than the predetermined threshold.

8. The image processing method according to claim 7, wherein the image obtaining step includes obtaining the image by receiving image data of the image from an external device.

9. The image processing method according to claim 7, further comprising a display step of prohibiting the obtained web page from being displayed if the degree of relevance is lower than the predetermined threshold, and of displaying the obtained web page if the degree of relevance is equal to or greater than the predetermined threshold.

10. The image processing method according to claim 7, wherein the print control step includes prohibiting the obtained web page from being printed if the degree of relevance is lower than the predetermined threshold, and issuing a command to print the obtained web page if the degree of relevance is equal to or greater than the predetermined threshold.

11. The image processing method according to claim 7, wherein the image obtaining step includes obtaining the image by scanning the image carried on paper.

12. A computer-readable storage medium storing thereon a computer program executed by a computer that controls an image processing apparatus, the computer program causing the computer to perform:
  an image obtaining step of obtaining an image including a code, the code representing a location of a web page;
  a web page obtaining step of obtaining the web page based on the code included in the obtained image;
  a calculation step of comparing the obtained image except the code with the obtained web page to calculate a degree of relevance between the obtained image except the code and the obtained web page; and
  a print control step of issuing a command to print the obtained image with the code excluded if the degree of relevance is lower than a predetermined threshold, and to print the obtained image without excluding the code if the degree of relevance is equal to or greater than the predetermined threshold.

13. The computer-readable storage medium according to claim 12, wherein the image obtaining step includes obtaining the image by receiving image data of the image from an external device.

14. The computer-readable storage medium according to claim 12, further comprising a display step of prohibiting the obtained web page from being displayed if the degree of relevance is lower than the predetermined threshold, and of displaying the obtained web page if the degree of relevance is equal to or greater than the predetermined threshold.

15. The computer-readable storage medium according to claim 12, wherein the print control step includes prohibiting the obtained web page from being printed if the degree of relevance is lower than the predetermined threshold, and issuing a command to print the obtained web page if the degree of relevance is equal to or greater than the predetermined threshold.

16. The computer-readable storage medium according to claim 12, wherein the image obtaining step includes obtaining the image by scanning the image carried on paper.

* * * * *